United States Patent
Cantwell

(10) Patent No.: US 10,307,662 B1
(45) Date of Patent: Jun. 4, 2019

(54) GAME SYSTEM AND METHOD UTILIZING QUANTUM PHENOMENA AS INTEGRAL PART OF GAME PLAY

(71) Applicant: Christopher Cantwell, Chino Hills, CA (US)

(72) Inventor: Christopher Cantwell, Chino Hills, CA (US)

( * ) Notice: Subject to any disclaimer, the term of this patent is extended or adjusted under 35 U.S.C. 154(b) by 187 days.

(21) Appl. No.: 15/415,702

(22) Filed: Jan. 25, 2017

Related U.S. Application Data

(60) Provisional application No. 62/286,744, filed on Jan. 25, 2016.

(51) Int. Cl.
*A63F 3/00* (2006.01)
*A63F 13/42* (2014.01)

(52) U.S. Cl.
CPC .......... *A63F 3/00643* (2013.01); *A63F 13/42* (2014.09)

(58) Field of Classification Search
CPC ......... A63F 13/42; A63F 3/00643; A63F 3/02
USPC ....................................... 463/14, 1
See application file for complete search history.

(56) References Cited

U.S. PATENT DOCUMENTS

| 7,434,806 B2 * | 10/2008 | Budden ..................... A63F 3/02 273/255 |
| 2010/0289217 A1 * | 11/2010 | Lavie ........................ A63F 3/02 273/242 |
| 2013/0157740 A1 * | 6/2013 | Louie ........................ A63F 3/02 463/14 |

OTHER PUBLICATIONS

Queen's University at Kingston, Ontario, Canada, Quantum Chess, Sep. 7, 2015, <http://research.cs.queensu.ca/Parallel/QuantumChess/QuantumChess.html>.*

\* cited by examiner

*Primary Examiner* — Chase E Leichliter
(74) *Attorney, Agent, or Firm* — FisherBroyles, LLP; Rob L. Phillips

(57) ABSTRACT

A game system and method utilizing quantum phenomena, such as entanglement, superposition and interference, to modify game play of a conventional game. The game of chess is one such game. As detailed herein, the manner in which quantum phenomena are integrated into the chess game allows players to strategize based on at least entanglement, superposition, measurement and interference. That is, the integration of quantum phenomena is not simply overlaid on the chess game but rather integral to how the chess game is played. The embodiments of the present invention are also predicated on game measurements being non-deterministic.

21 Claims, 20 Drawing Sheets

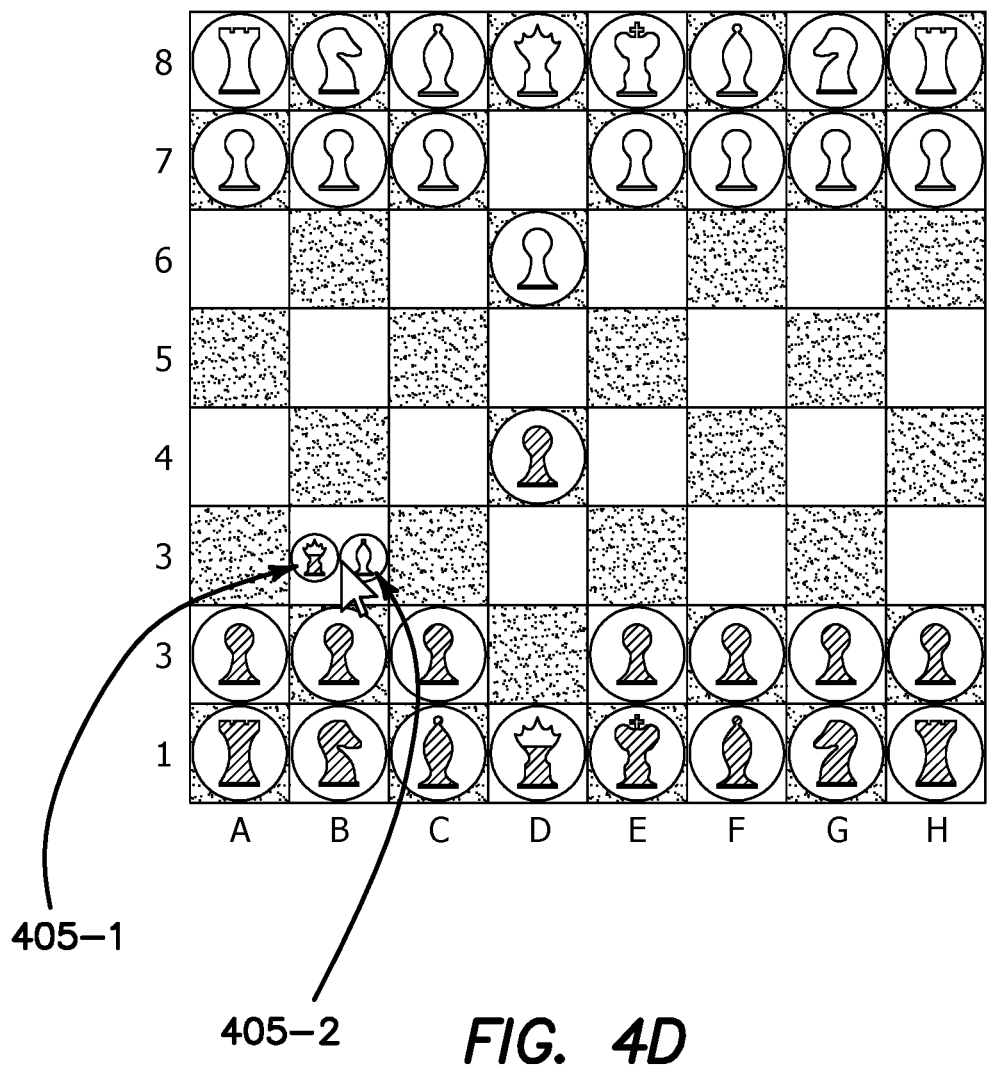
405-1
405-2   FIG. 4D

Failed Attacked (Type 2)

1202

|   |   |   |   |   |
|---|---|---|---|---|
| 0 ⊘ | 1 ⊘ | 2 | 3 ⊘ | 4 ⊘ |
| 5 | 6 | 7 ⊘ | 8 | 9 |
| 10 | 11 | 12 ⊘ | 13 | 14 |
| 15 | 16 | 17 ⊘ | 18 | 19 |
| 20 ⊘ | 21 ⊘ | 22 ⊘ | 23 ⊘ | 24 ⊘ |

New Game

Player 1's Turn!

Current Action: Attack
Actions Remaining: 1

○ Half Move
○ Measure
◉ Attack

New Game:
Player 1: Half Move (2,7)
Player 1: Half Move (7,12)
Player 2: Half Move (22,17)
Player 2: Attack (17,12)
 Measure Space 17:
 empty. No Attack.
Player 1: Half Move (2,7)
Player 1: Half Move (7,12)
Player 2: Half Move (22,17)
Player 1: Attack (7,12)
 Measure Space 7: Player 1
 found. Attack!
 Measure Space 12: empty.
 Attack failed! Player 2 gained
 a piece!

*FIG. 8B*

Successful Attack

1203

|   |   |   |   |   |
|---|---|---|---|---|
| 0 | 1 | 2 | 3 | 4 |
| 5 | 6 | 7 | 8 | 9 |
| 10 | 11 | 12 | 13 | 14 |
| 15 | 16 | 17 | 18 | 19 |
| 20 | 21 | 22 | 23 [Player 2 Go!] | 24 |

New Game

Player 2's Turn!

Current Action: Half move
Actions Remaining: 2

◉ Half Move
○ Measure
○ Attack

New Game:
Player 1: Half Move (2,7)
Player 1: Half Move (7,12)
Player 2: Half Move (22,17)
Player 2: Attack (17,12)
 Measure Space 17:
 empty. No Attack.
Player 1: Half Move (2,7)
Player 1: Half Move (2,7)
Player 2: Half Move (22,17)
Player 1: Attack (7,12)
 Measure Space 7: Player 1
 found. Attack!
 Measure Space 12: empty.
 Attack failed! Player 2 gained
 a piece!
Player 1: Attack (7,12)
 Measure Space 7: Player 1
 found. Attack!
 Measure Space 12: Player 2
 found.
 Attack successful! Player 2
 lost a piece!

*FIG. 8C*

GAME SYSTEM AND METHOD UTILIZING QUANTUM PHENOMENA AS INTEGRAL PART OF GAME PLAY

CROSS REFERENCE

This application claims priority to U.S. Patent Application No. 62/286,744 filed Jan. 25, 2016 and which is incorporated herein for any and all purposes.

FIELD OF THE INVENTION

The embodiments of the present invention relate to a game system and method utilizing quantum phenomena (e.g., superposition). In one embodiment, the game of chess is modified to incorporate quantum phenomena into conventional game play providing a more versatile experience while providing players with knowledge of quantum phenomena in a real-world setting.

BACKGROUND

Quantum physics, quantum mechanics or quantum "anything" are terms with which most people are completely ignorant and/or confused. Quantum phenomena are for PhDs and other highly-educated individuals. Given the perceived complexity of quantum physics, common, and even educated, people tend to be overly intimidated to start down a road of understanding more about the subject.

Accordingly, it would be advantageous to develop a game system and method involving games which incorporate quantum phenomena into the play thereof. Importantly, the quantum phenomena should be integral to the game play to effectively explore the quantum phenomena to assist players with developing a more intuitive understanding of how quantum phenomena work.

SUMMARY

The game system and method herein utilize quantum phenomena, such as entanglement, superposition, measurement and interference, to modify game play of a conventional game. This disclosure focuses on the game of chess, but those skilled in the art will recognize that the embodiments of the present invention are suitable for other conventional games (e.g., checkers). As detailed herein, the manner in which quantum phenomena are integrated into the chess game allows players to strategize based on at least entanglement, superposition, measurement and interference. That is, the integration of quantum phenomena is not simply overlaid on the chess game but rather integral to how the chess game is played. The embodiments of the present invention are also predicated on game measurements being non-deterministic.

According to one embodiment, a computer-implemented game system comprises: memory storing data for playing a chess game via a user interface and a processor programmed to: responsive to a player inputting a desired move of a chess piece from a current space on a virtual chess board to a new space on said virtual chess board creating unique chess board states where said chess piece has some probability of occupying said current space or said new space thus representing quantum superposition; utilize measurement when two or more chess pieces have a non-zero probability of occupying a given space to reduce a count to at most one chess piece occupying said given space; and utilize an attack when a desired chess piece moves raises the opportunity for two opposing chess pieces to occupy a same conflict space on said virtual chess board, said attack configured to: (i) run a first measurement to determine if an attacking chess piece occupies said conflict space; (ii) if said first measurement results in a determination that said attacking chess piece occupies said conflict space, run a second measurement to determine if a defending chess piece occupies said conflict space; and (iii) remove said defending chess piece if said first measurement and said second measurement determines that said attacking chess piece and defending chess piece occupy said conflict space.

Other variations, embodiments and features of the present invention will become evident from the following detailed description, drawings and claims.

BRIEF DESCRIPTION OF THE DRAWINGS

FIGS. 4A-4E show a first set of screen shots detailing various aspects of the quantum chess game according to the embodiments of the present invention;

FIGS. 8A-8C illustrate screen shots of possible attack outcomes according to the embodiments of the present invention.

DETAILED DESCRIPTION

Figure 1:
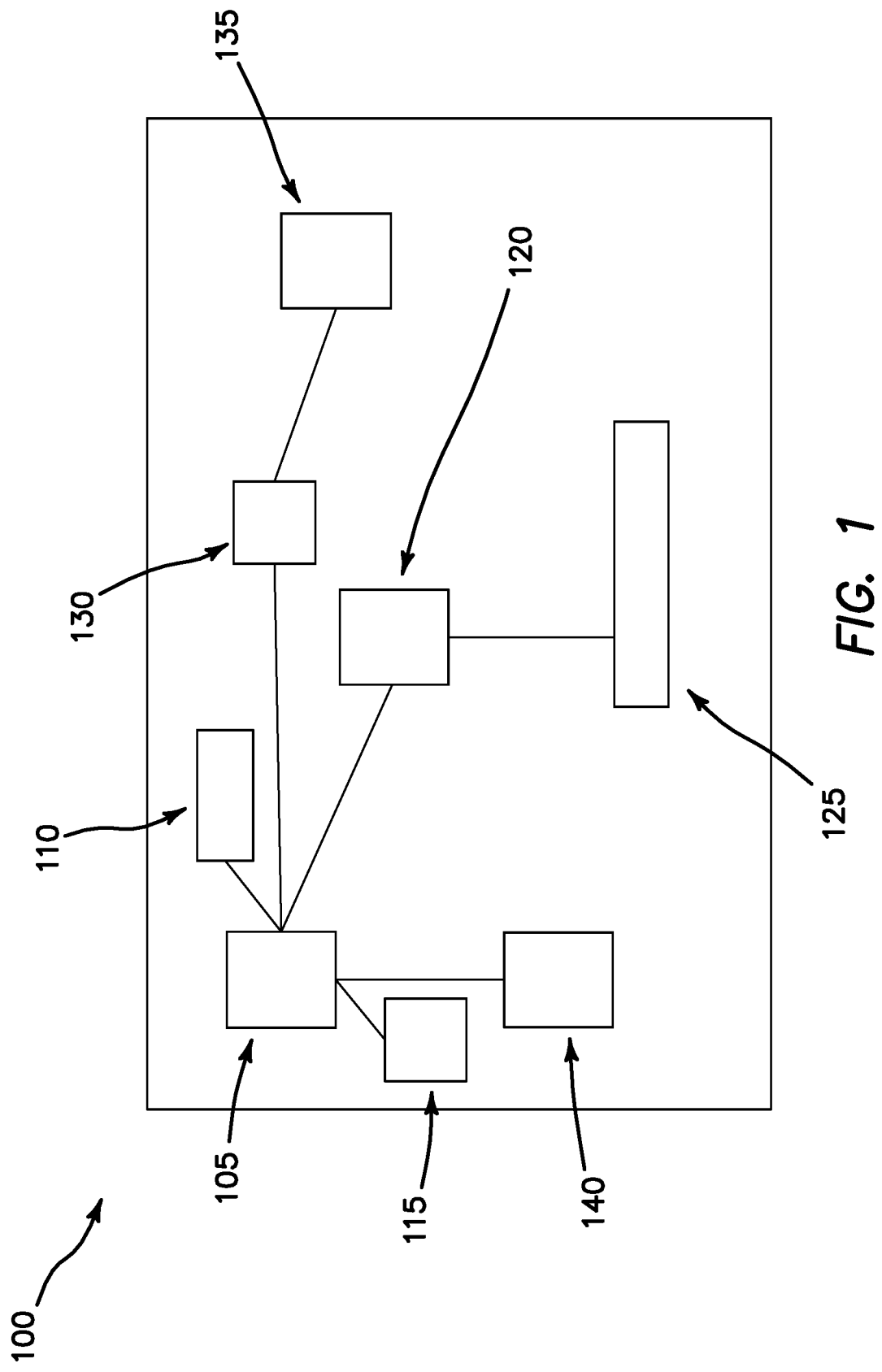
FIG. 1 illustrates a block diagram of components of an electronic device for conducting a quantum chess game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming device" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention may be facilitated by an electronic gaming device whereby a single player plays against the electronic gaming device's processor as described herein. The electronic gaming device may be a standalone device and or series thereof forming part of a gaming device network or not. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming device 100 may be linked to a central game server which allows players to select from a number of games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100.

Those skilled in the art will recognize that the configuration and features of the electronic gaming device 100 disclosed herein are exemplary and may be altered in any number of ways without impacting the embodiments of the present invention.

Figure 2:
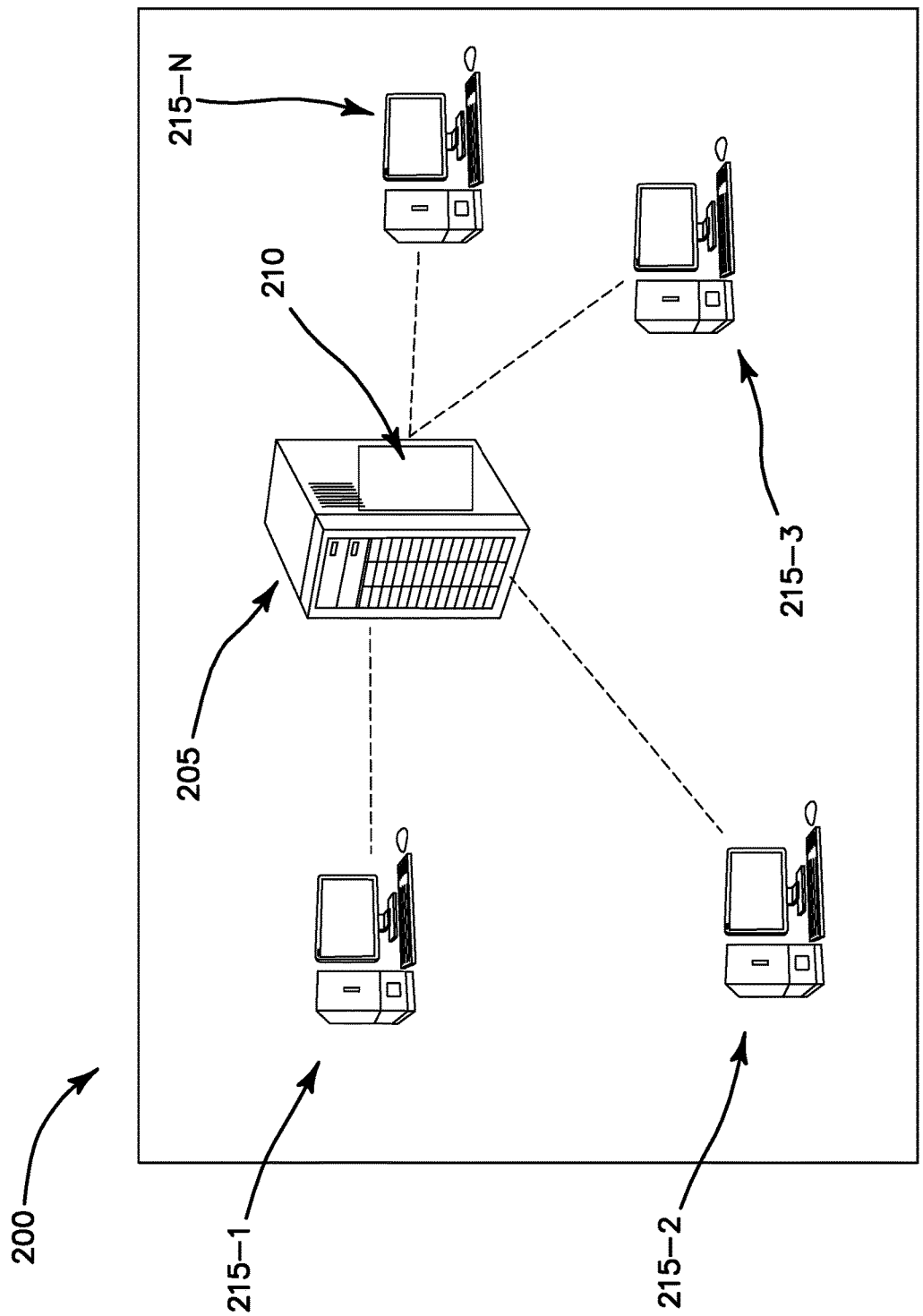
FIG. 2 illustrates a block diagram of a wireless network system accessible by mobile devices for conducting quantum chess games according to the embodiments of the present invention.

FIG. 2 shows a block diagram of a gaming network 200 which may be used to facilitate play of the game via linked gaming devices according to the embodiments of the present invention. The gaming network 200 comprises a central processor 205 (e.g., processor-equipped game server) in communication with multiple gaming devices 215-1 through 215-N as described in FIG. 1. The central processor 205 runs the game software 210.

Figure 3:
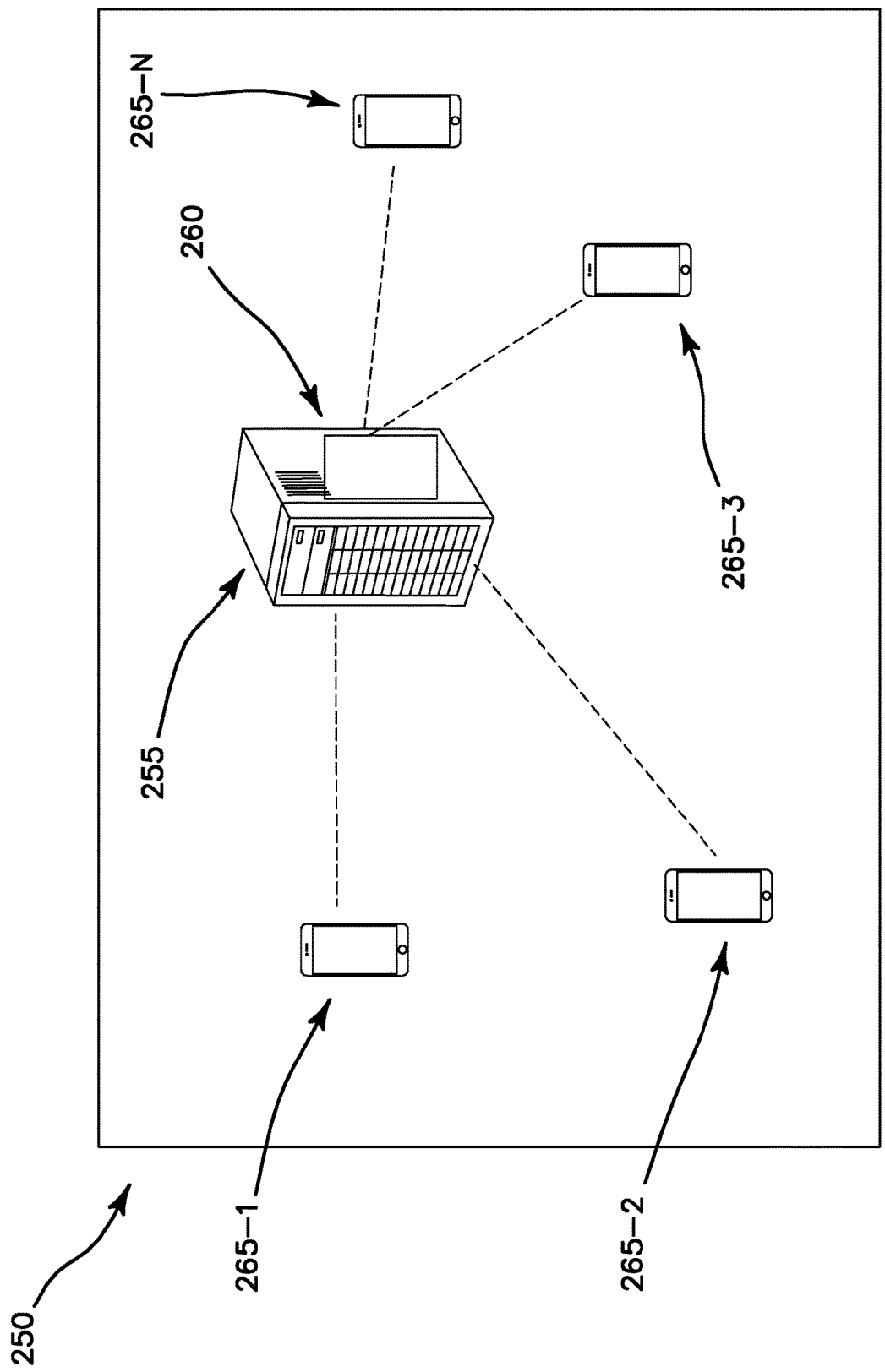
FIG. 3 illustrates a game network of the type for facilitating play of a quantum chess game according to the embodiments of the present invention.

FIG. 3 shows a block diagram of a wireless system 250 which may be used to facilitate remote play of the game according to the embodiments of the present invention. The wireless network system 200 comprises a processor-equipped game server 255, including one or more processors running game software 260, and remote devices 265-1 through 265-N (e.g., smart phones) configured to access said game server 255 facilitating game play on the remote devices 265-1 through 265-N. In another embodiment, the video game according to the embodiments of the present invention may be in the form of a software application ("App") downloadable onto smart phones, tablets or computers and playable via processing power and a user interface associated therewith.

While the embodiments of the present invention are suitable for numerous types of games, the description herein focuses on the game of quantum chess.

Quantum mechanics is a relatively new but yet well-studied field of science. The concept is a challenge for most typical people to grasp with any comfort or clarity. The embodiments of the present invention are directed, in part, to permit players to more intuitively grasp quantum concepts such as superposition, measurement, entanglement and interference. The concept of superposition involves a game piece having some probability of being on two spaces; the concept of measurement involves measuring the value of a space to determine if the game piece occupies the space; the concept of entanglement involves moving a game piece to a space through another game piece in superposition which would, if the game piece was in the way, be improper—the two game pieces are thereby entangled; and the concept of interference involves a wave function describing game pieces affecting how game pieces combine.

For purposes of foregoing an unrealistic amount of computer memory and rendering the quantum chess game understandable, certain game rules may be integrated. Depending on the embodiment, the rules may be used wholesale or in various combinations as desired. Table 1 shows exemplary game rule options which are described in more detail below.

TABLE 1

Power Pieces (i.e., non-pawns) May Perform Quantum Moves (Pawns Moved in Traditional Manner)
Quantum Moves May Not Be Used to Capture an Opponent's Game Piece (i.e., a Player May Not Move a Game Piece onto a Space That Has Any Probability of Occupancy by an Opposing Game Piece)
Attempting to Capture a Piece Occupying a Space in Superposition Captures the Game Piece on the Substate for Which the Game Piece is Actually Present in the Target Space
Attacking from a Space in Superposition Only Acts on the Subspace for TABLE 1-continued Which the Game Piece is Present
Measurement of the Superposition Occurs When a Space is Possibly Occupied by More than One Game Piece Type
Game is Won by Killing the King on all Possible Game Board Configurations
May Only Make Moves that Change the State of the Game Board
May Only Make Moves from or Measure Spaces that the Player has Game Pieces Occupying In one embodiment, players may take several actions per move comprising (i) swiping a piece equally between two spaces (superposition); (ii) measuring a space to determine if the space is occupied (measurement); and (iii) attacking a space by moving a game piece onto an occupied space with a standard move (attack).

Figure 6A:
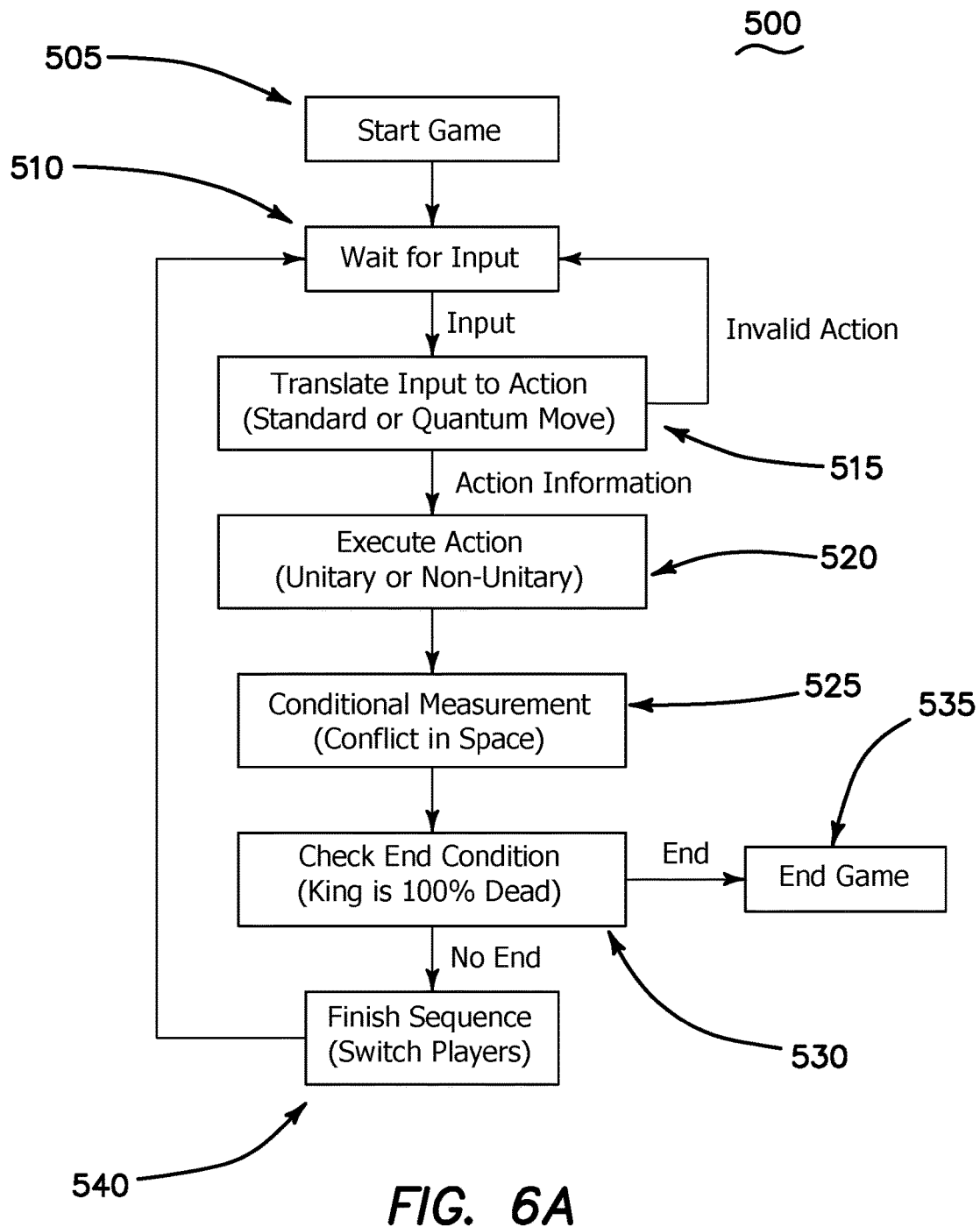
FIG. 6A illustrates a flow chart detailing the broad operation of a quantum chess game and FIG. 6B illustrates a user interface game system interaction flow chart according to the embodiments of the present invention.

FIG. 6A shows a flow chart 500 detailing a broad overview of quantum chess game procedures according to the embodiments of the present invention. At 505, a quantum chess game starts. At 510, the system waits for player input. The game may be played between two players or a single player against a computer. At 515, the system translates input to action in the form of a standard or quantum move. In one embodiment, pawns are moved in a conventional/standard manner (i.e., not subject to quantum parameters). All other pieces (e.g., Kings, Queens, Rooks, Bishops and Knights) are moved pursuant to quantum parameters. If the proposed move is improper, the flow chart 500 loops back to 510. At 520, the system executes the move. The move may be unitary or non-unitary as described below. At 525, a conditional measurement occurs. At 530, an end condition is checked. If the end condition is met (e.g., King is dead), at 535, the game ends. If the end condition is not met, at 540, the move sequence ends, control is moved to the other player and the flow chart 500 loops back to 510 for the other player's input.

Figure 6B:
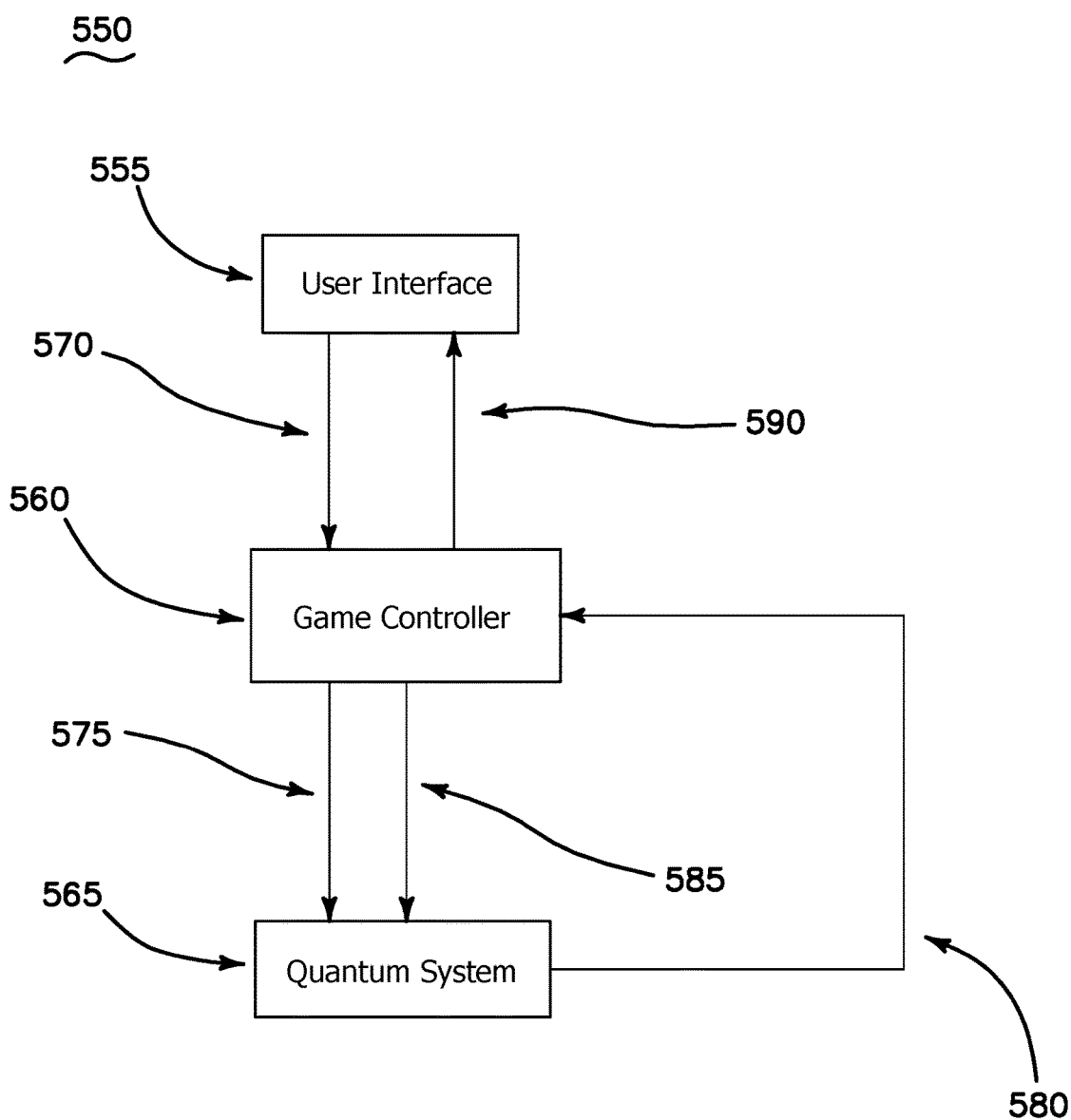

FIG. 6B shows a user interface game system interaction flow chart 550 according to the embodiments of the present invention. A user interface 555 communicates with a game controller 560 in communication with the quantum system 565. A user input 570 is received by the game controller 560 which transmits the appropriate standard or quantum move unitary based on the user input and the spaces involved 575 to the quantum system 565. The quantum system 565 then transmits the quantum state 580 to the game controller 560. The game controller 560 then causes a measurement if the space has a non-zero occupancy by more than one type of game piece 585 and provides visual information including translation of quantum information 590 to players via the user interface 550.

Figure 4A:
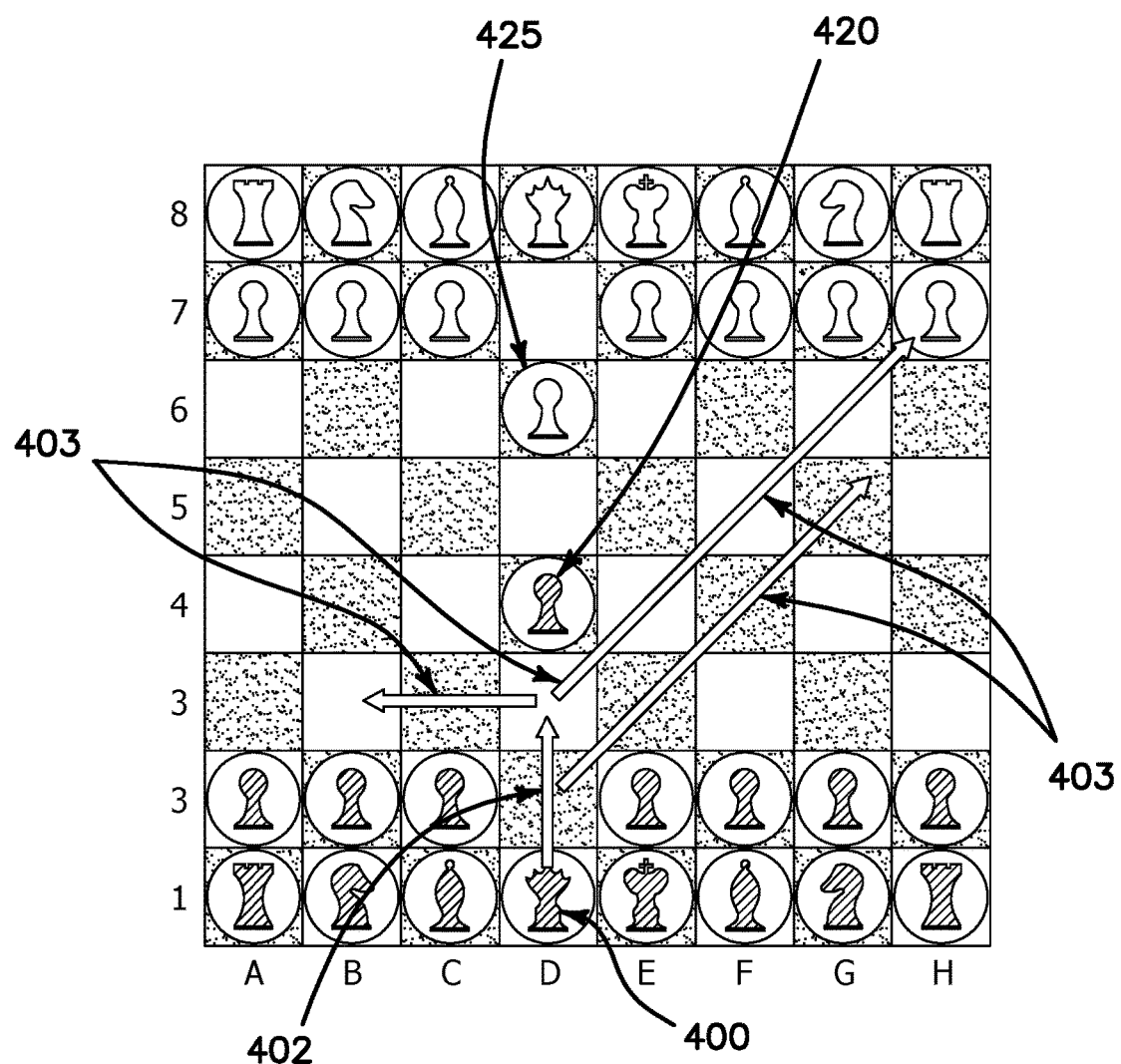
Figure 4B:
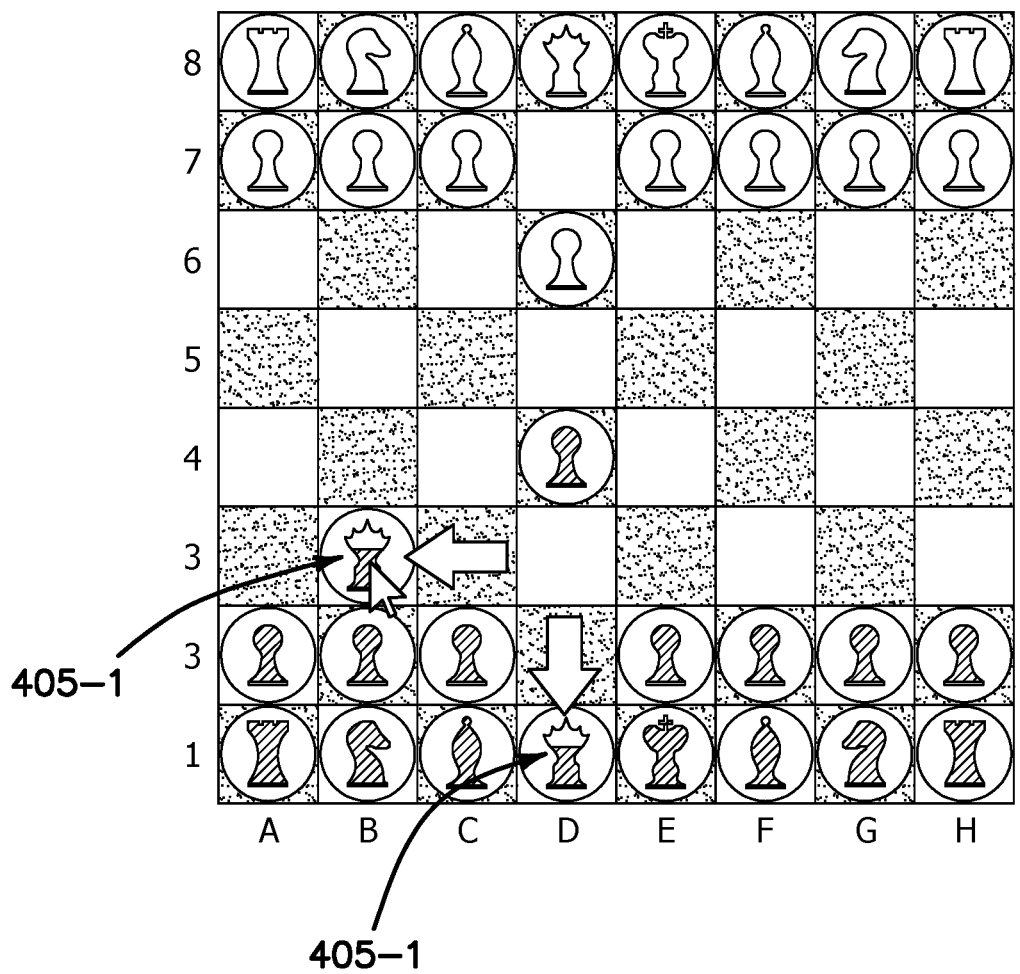
Figure 4C:
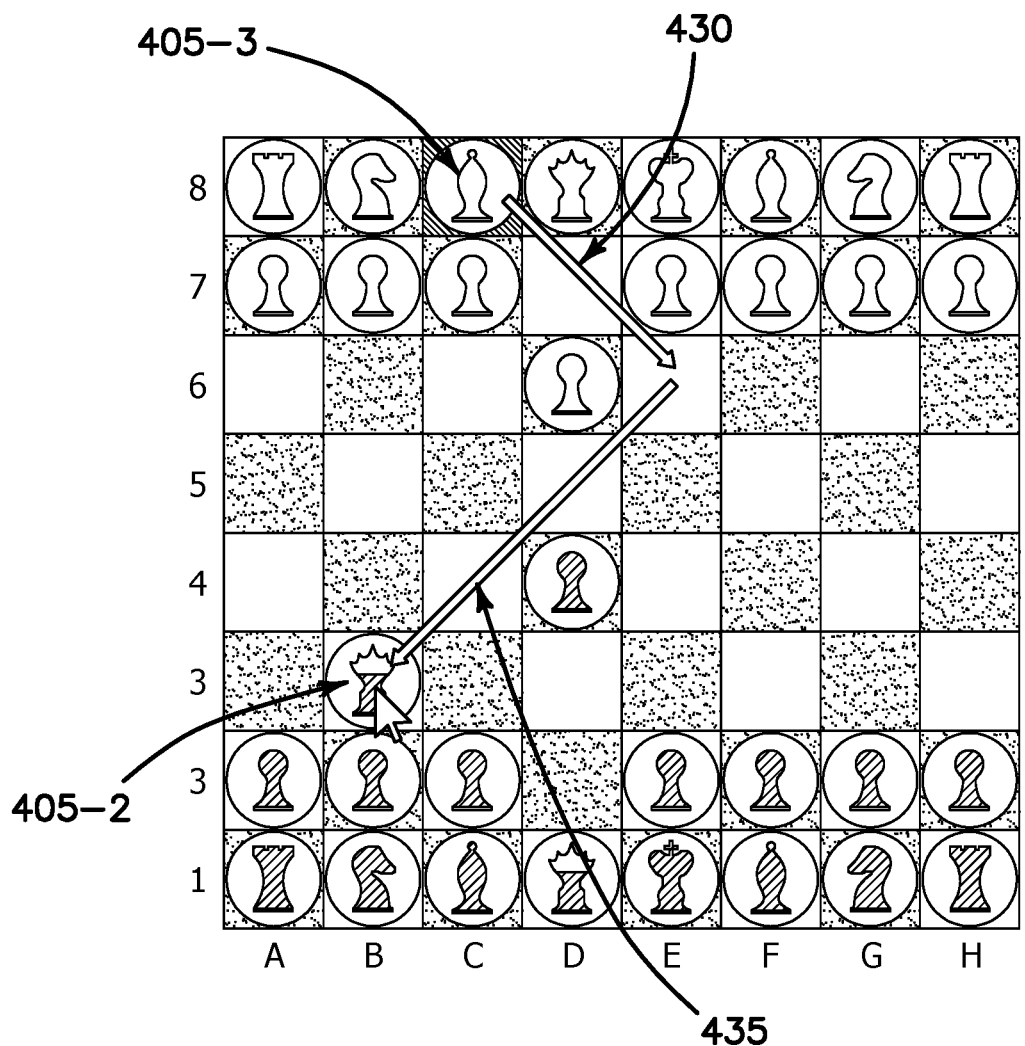
Figure 4E:
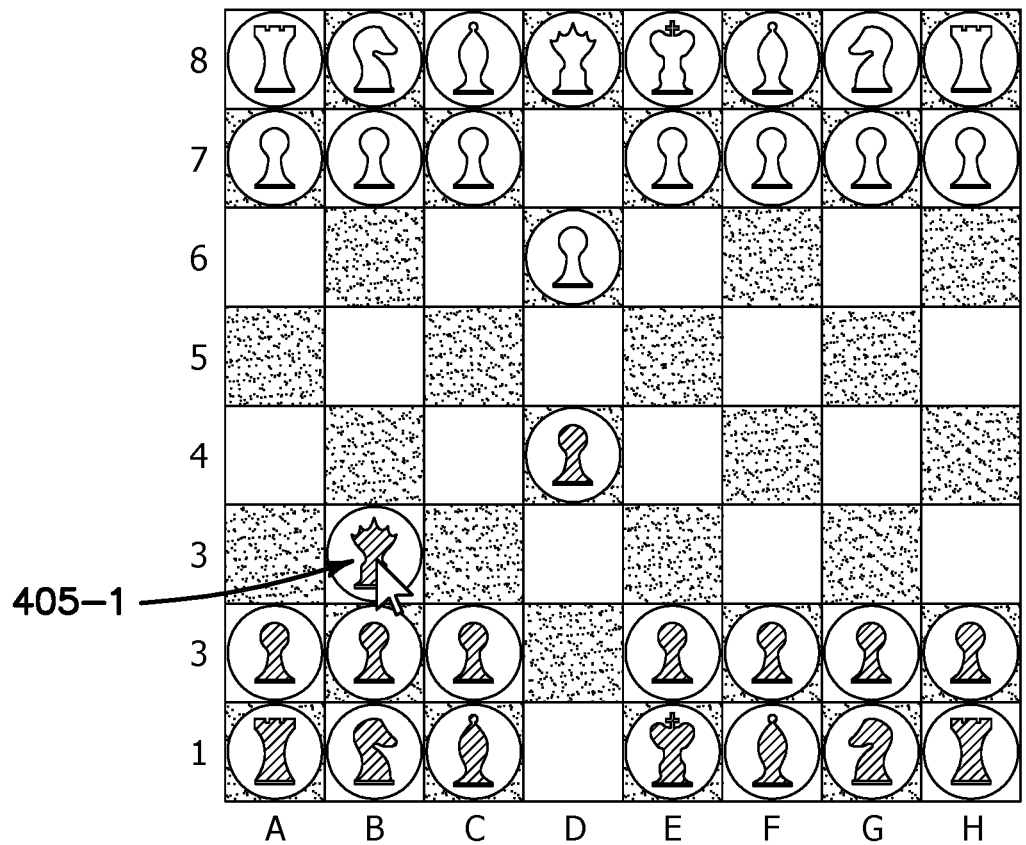
Figure 5A:
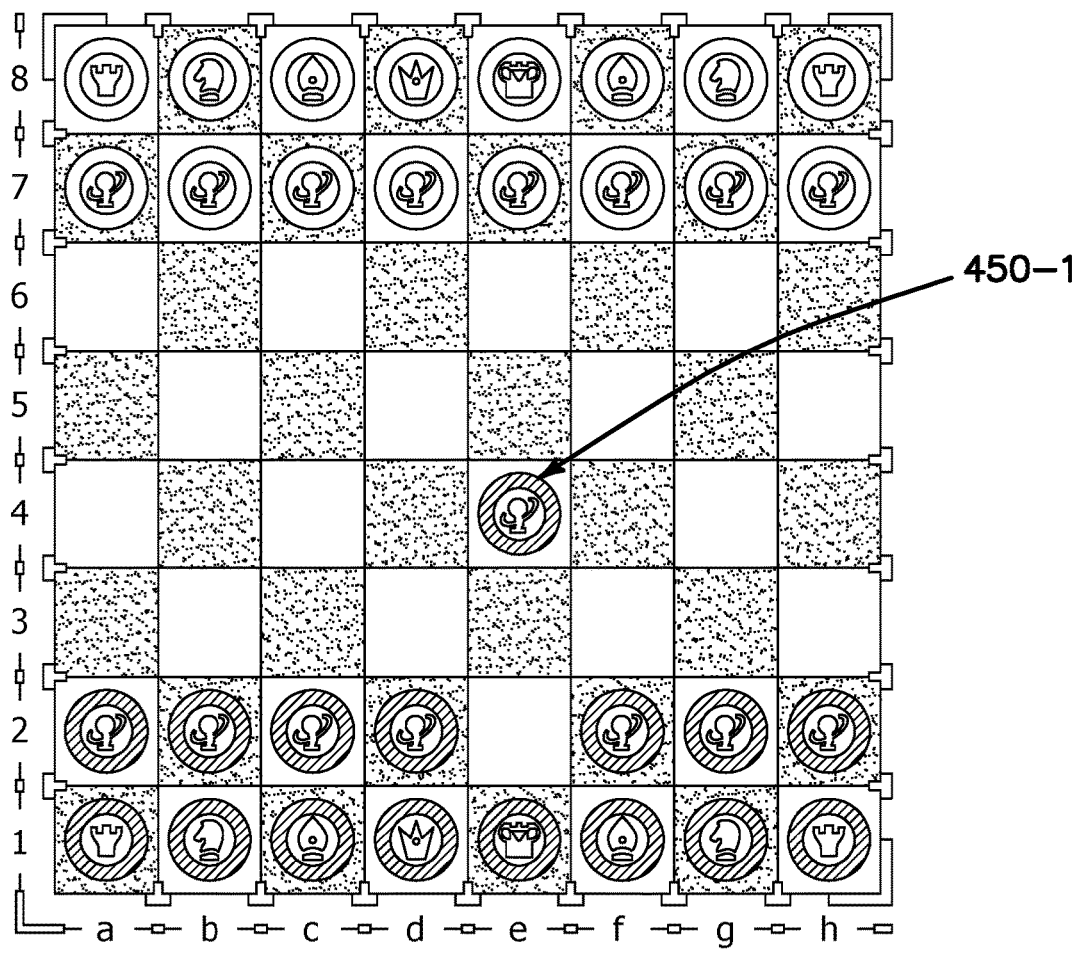
FIGS. 5A-5D show a second set of screen shots detailing various aspects of the quantum chess game according to the embodiments of the present invention.

A quantum move allows a game piece to move up to two standard moves in one turn. FIG. 5A shows a standard move associated with a pawn 450-1. With the quantum move, the game piece may or may not move. The quantum move creates a superposition of game board configurations corresponding to each of the possibilities. FIG. 4A shows possible quantum moves (i.e., two standard move combinations) associated with the Queen 405 and made up of a first leg 402 and multiple second leg options 404 in this instance. FIG. 4A also shows two pawns 420, 425 having been moved in a standard manner. In one embodiment, a quantum move cannot be used for attack. That is, a standard move must be used for an attack. FIG. 4B shows the game board after a quantum move of the Queen 405 from space D1 to space B3. As shown, the Queen 405-1 has an equal probability of being on space D1 and space B3. To represent the superposition, a Queen game piece is shown on both space D1 and space B3 with only half of each Queen 405-1 being fully colored. The half-colored portion represents the fact that there is a 50% chance the Queen 405-1 is on space D1 and a 50% chance the Queen 405-1 is on space B3. FIG. 4C shows a potential quantum move of Bishop 405-2 from space C8 to space B3 occupied by Queen 405-1. The quantum move comprises a first leg 430 and second leg 435. Since in this embodiment a quantum move cannot be used for an attack, the move triggers a measurement action to determine if the Queen 405-1 is actually on space B3. FIG. 4D shows the measurement action occurring in space B3. As shown, the Queen 405-1 and Bishop 405-2 are both shown on space B3 in reduced size. After a brief time period, the results of the measurement become known as shown in FIG. 4E. Two results are possible with the measurement—(i) if the Queen 405-1 is on space B3, the Queen 405-1 will appear fully colored and the Queen 405-1 on space D1 will disappear and the Bishop 405-2 returns to space C8 (this is result shown in FIG. 4E) or (ii) if the Queen 405-1 is not on space B3, the Queen 405-1 on space B3 disappears and the Bishop 405-2 takes its place on space B3 and the Queen 405-1 on space D1 returns to being fully colored (this is not an attack because the Queen 405-1 was never occupying space B3).

Figure 5B:
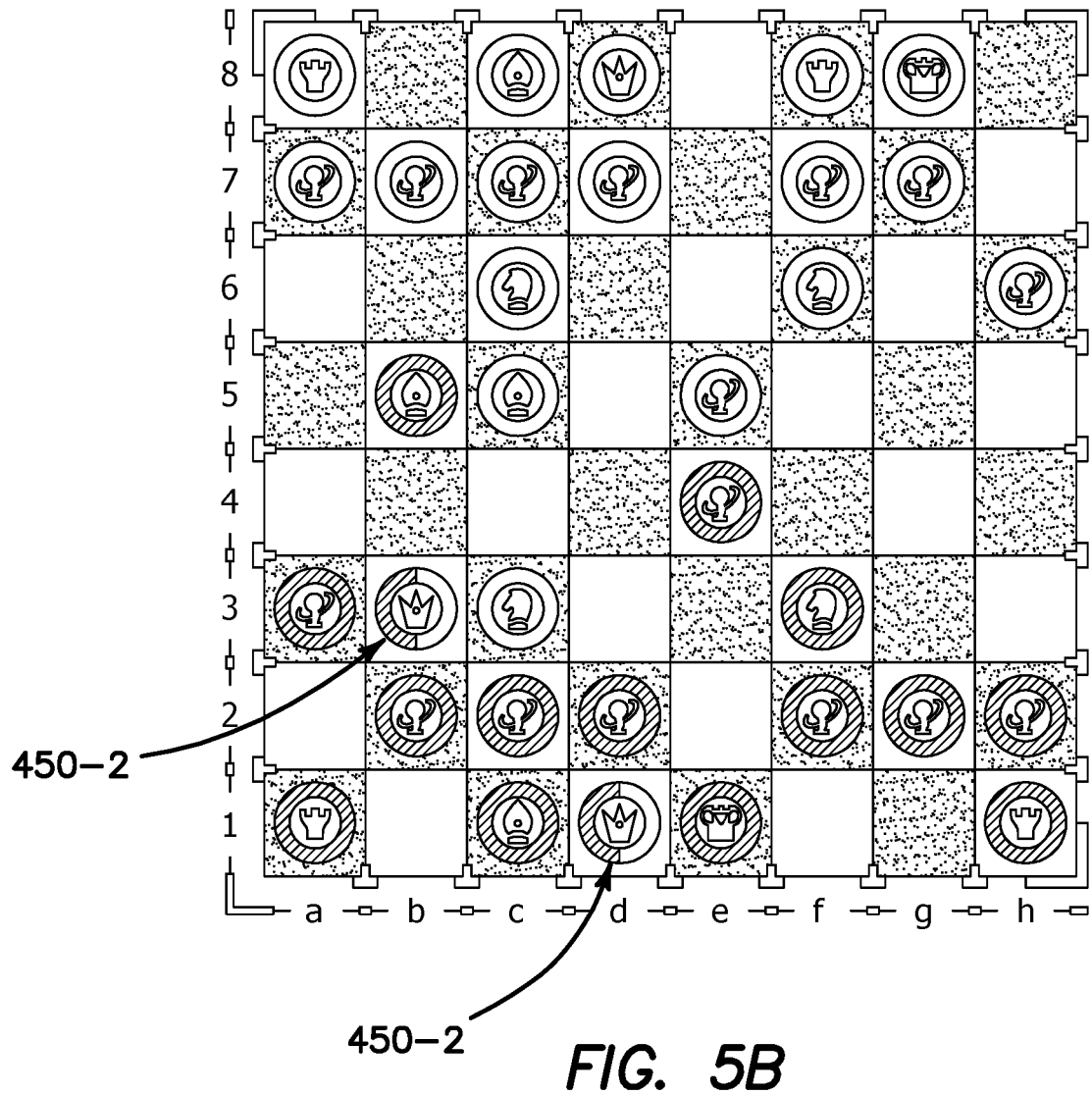
Figure 5C:
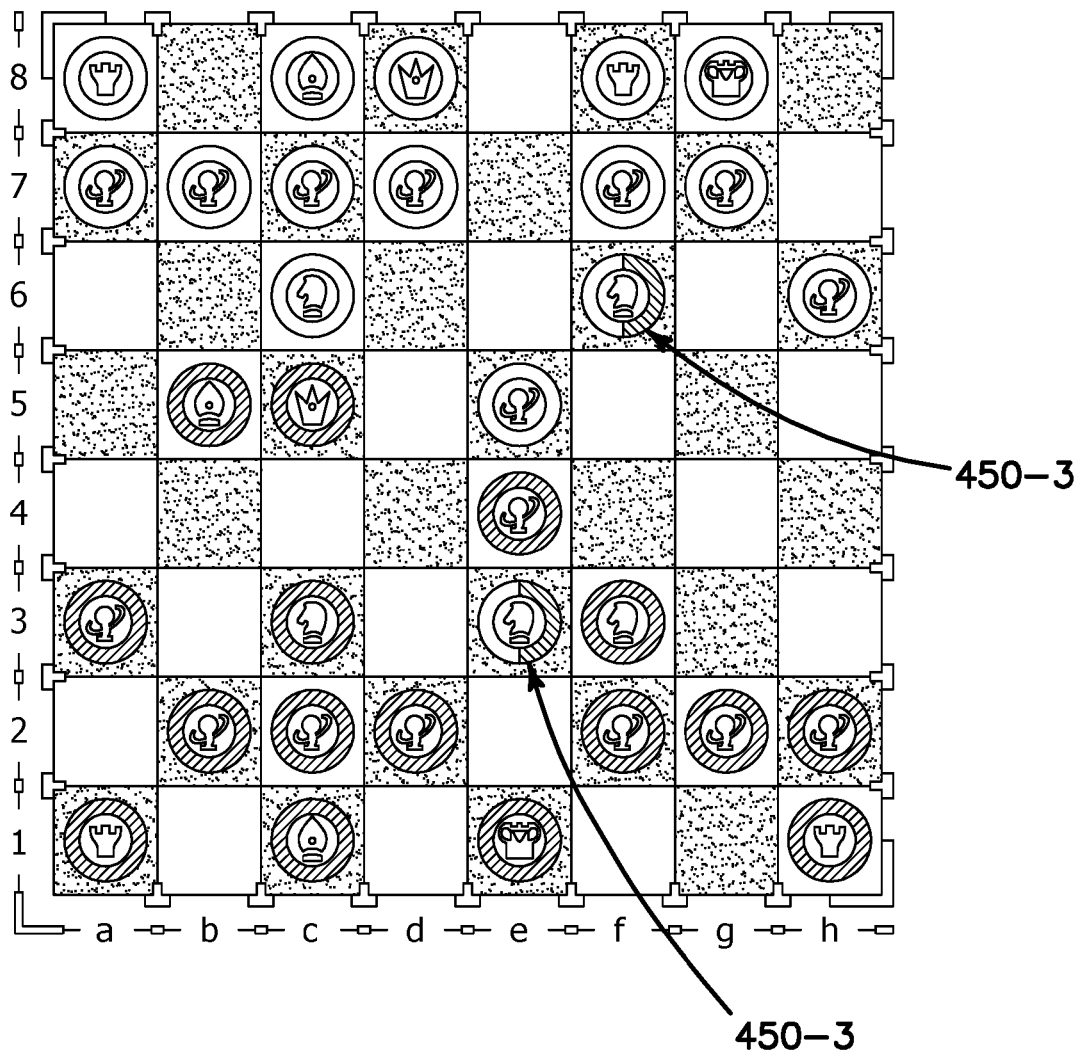
Figure 5D:
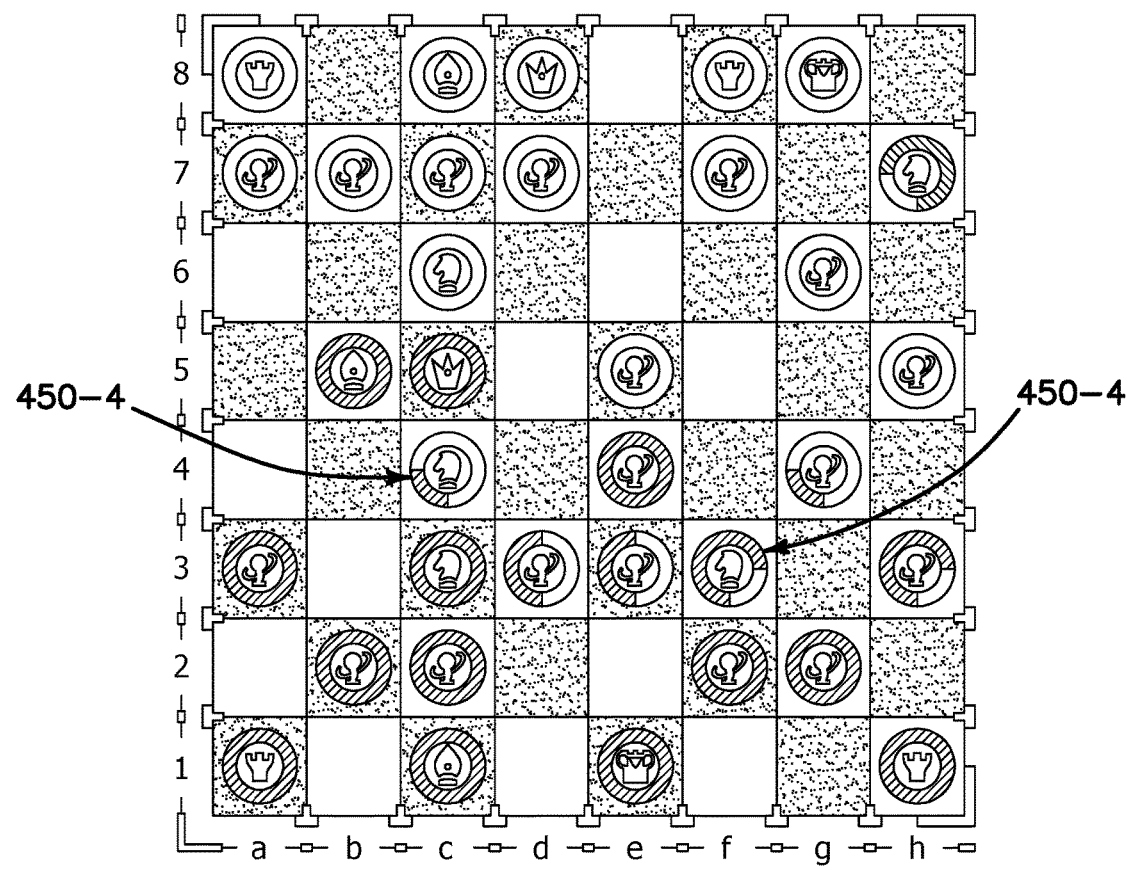

FIGS. 5A-5D show an alternative game board design with alternative game pieces depicting superposition. FIG. 5A shows a standard move of Pawn 450-1 from E2 to E4. FIG. 5B shows that the King 450-2 has been the subject of a quantum move and now has an equal chance of occupying space D1 and space B3. FIG. 5C shows that the Knight 450-3 has been the subject of a quantum move and now has an equal chance of occupying space E3 and space F6. In FIG. 5D shows a Rook 450-4 that has an unequal chance of occupying two different spaces, namely space C4 and space F3. As shown, the Rook 450-4 has a better chance of occupying space F3 than space C4 as represented by the 75% colored game piece on space F3 versus the 25% colored game piece on space C4.

The magnitude of the amplitude of the depends on the state of the game board. Initially the amplitudes are weighted evenly so that there is a 50-50 chance the game piece moved or did not move. A game piece follows all possible paths to the target space such that its amplitude is divided among the possible paths. A path that has some probability of being blocked (i.e., a space in the path has a non-zero probability of having a game piece) decreases the amplitude that the piece moved. A probability 1 blocked path is not deemed a possible path.

In one embodiment, the quantum move is performed using the square root of a swap unitary while the standard move is performed using the swap unitary. The square root swap means that two identical consecutive moves have the effect of giving the game piece probability 1 of being on the target space. The same effect is achieved by two standard moves in sequence. The unitaries act on source spaces and target spaces. Valid move unitaries are determined based on the states of the spaces involved as well as the states of all spaces in the path therebetween. A Queen, for example, may not move to a space if for all basis states (i.e., board configurations) present in the superposition there is a game piece of any type between the target and the source. The unitary describing such a move is deemed invalid and is not considered in the list of possible moves for a player to perform. In one embodiment, the Knight does not have such restrictions rendering it one of the most important quantum chess game pieces.

Capturing a game piece is non-unitary but in an alternative embodiment can be made unitary by using invisible "ancilla" spaces to store captured game pieces. Capturing then changes the target space value to empty and then performs the appropriate movement unitary between the source and target.

When two or more game pieces have a non-zero probability of occupying the same space a measurement occurs to reduce the count to at most one piece in the space. The system measures a particular place value in the space to determine if the game piece is on the space or not based on its probability given the superposition describing the game board. In one embodiment, a random number is selected and if the number is less than or equal to the probability of finding the game piece in the space then the game piece is on the space and superposition is collapsed to include only those basis states where the game piece is occupying the space. Otherwise, the superposition is collapsed to include only those basis states where the game piece is not occupying the space. Alternative embodiments include the player selecting which value to measure for or measuring the space to determine the exact value leaving no possibility for superposition after the measurement.

Figure 7A:
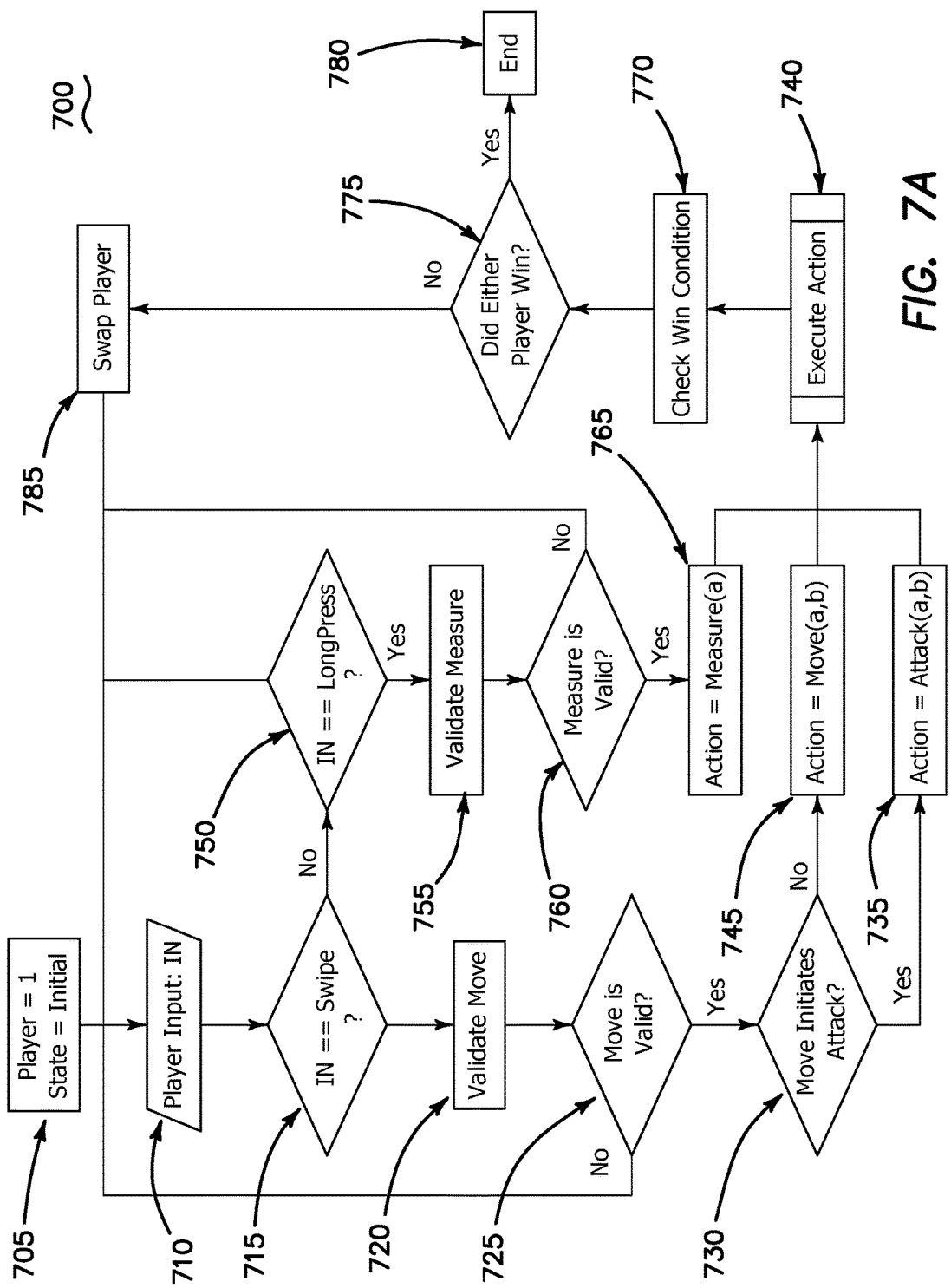
FIGS. 7A-7E illustrate various flow charts providing additional details of the quantum chess game operations according to the embodiments of the present invention.

Flow charts 7A-7E show more detailed game procedures according to the embodiments of the present invention. Flow chart 700 of FIG. 7A details a game procedure starting with a first player move with the chess board state set at its initial state. At 705, the first player inputs an action. At 710, it is determined if the action is a chess piece move (i.e., swipe). If not, at 715, the system identifies the action as a measurement. If, at 715, it is determined that the action is a chess piece move, at 720, the move is validated. At 725, it is determined if the move is valid. If not, the flow chart 700 loops back to 705. If the move is valid, at 730, it is next determined if the move initiates an attack (i.e., non-quantum move). If the move initiates an attack, at 735, the attack is identified and, at 740, the attack action is executed. If the move does not initiate an attack, at 745, the move is identified and, at 740, the move action is executed. At 715, if the player input is not a move/swipe action then, at 750, the player input represents a measurement action. At 755, the measurement is validated. At 760, it is determined if the measurement is valid. If not, the flow chart 700 loops back to 710. If the measurement is valid, at 765, the measurement is identified and, at 740 the measurement action is executed. At 770, a win condition is checked. At 775, it is determined if either player has won the chess game. If so, at 780, the game ends. If no player wins at 775, at 785, the system swaps players permitting the other player to initiate an input at 705.

Figure 7B:
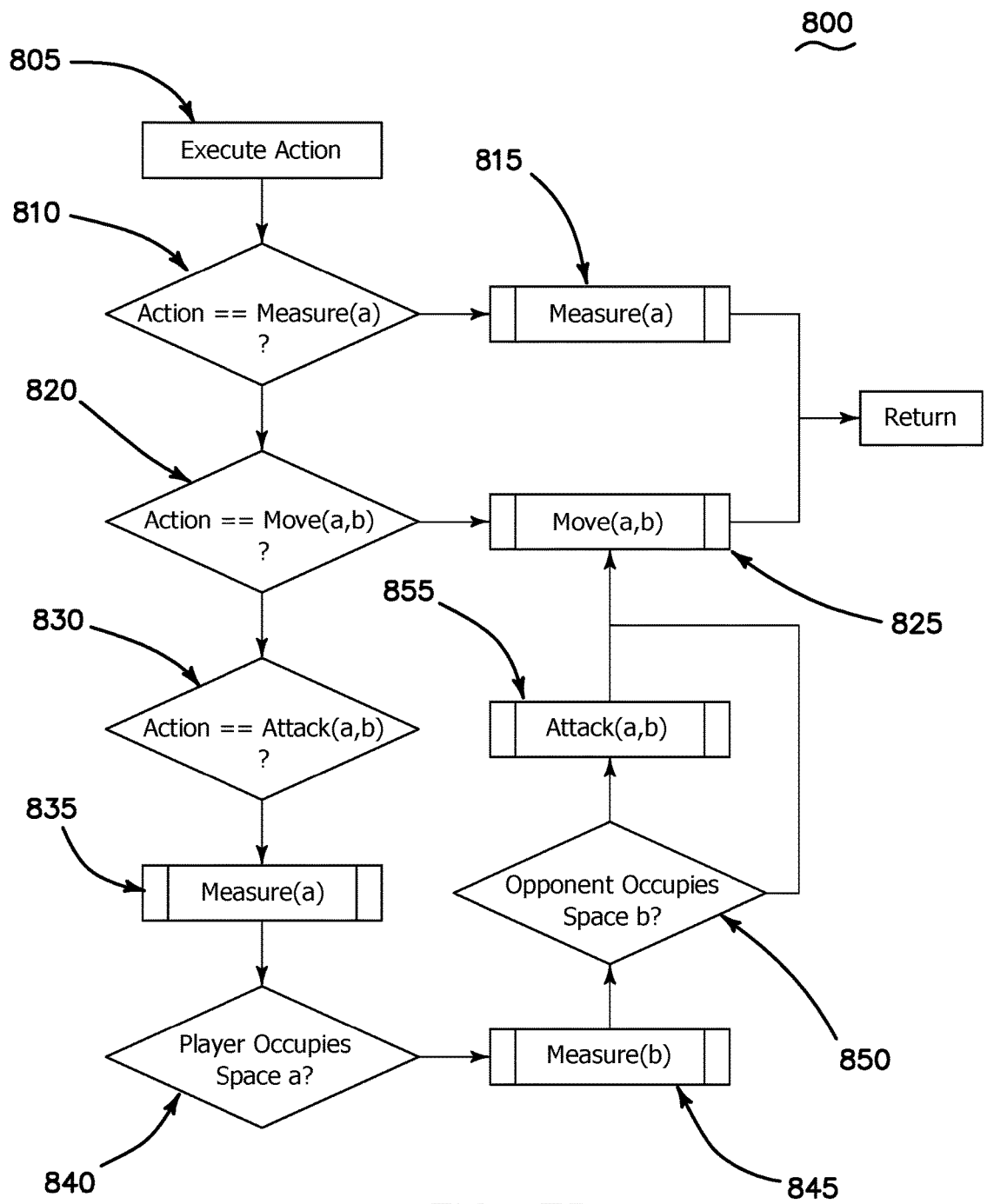

Flow chart 800 of FIG. 7B details a sequence of events associated with beginning the execution process. At 805, an action based on a player input is to be executed. At 810, it is determined if the action is a measurement. If so, at 815, the measurement of space a is executed (as detailed by flow chart 900 of FIG. 7C). If the action is not a measurement action, at 820, it is determined if the action is a move. If so, at 825, the move (involving spaces a and b) is executed (as detailed by flow chart 1000 of FIG. 7D). If the action is not a measurement or move, at 830, the action is deemed an attack. At 835, the measurement of space a is executed (as detailed by flow chart 850 of FIG. 7C). At 840, it is determined if the player occupies space a, after which, at 845, the measurement of space b is executed. At 850, it is determined if an opponent occupies space b. At 855, an attack is executed (as detailed by flow chart 1110 of FIG. 7E).

Figure 7C:
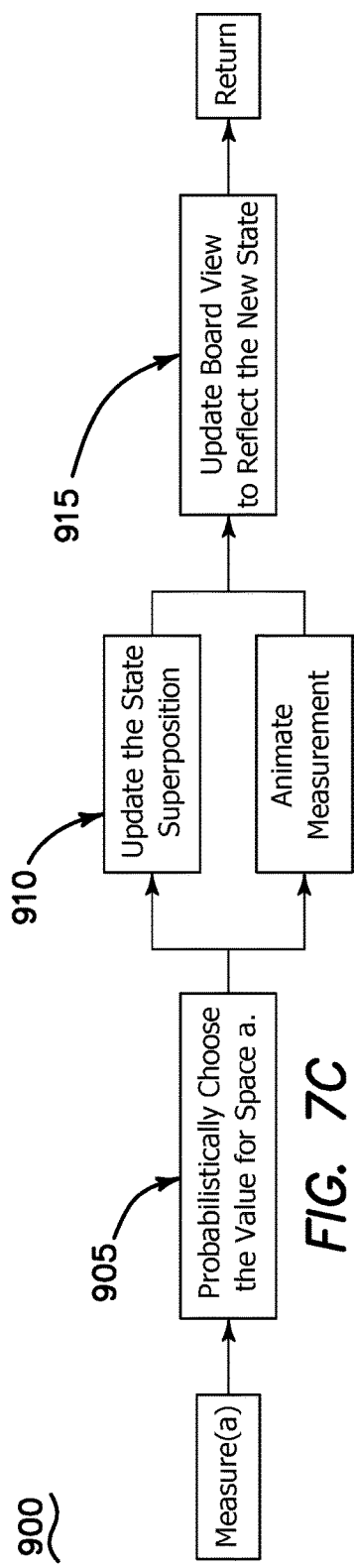

Flow chart 900 of FIG. 7C details a measurement action of space a. At 905, a value for space a is probabilistically chosen. At 910, the superposition state is updated and the measurement action is visually animated. At 915, the board view is updated.

Figure 7D:
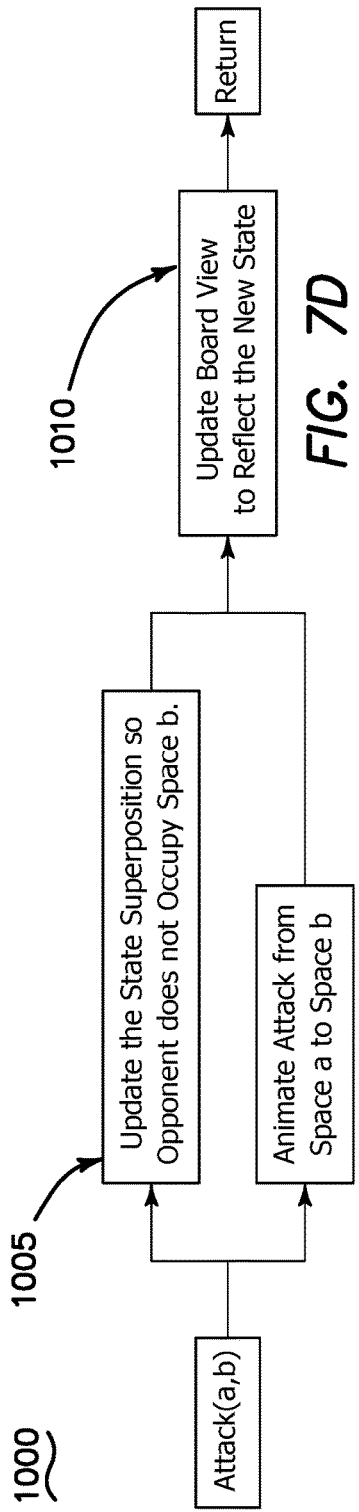

Flow chart 1000 of FIG. 7D details a move action is executed. At 1005, the superposition state is updated to reflect move between space a and b and the move action is visually animated. At 1010, the board view is updated.

Figure 7E:
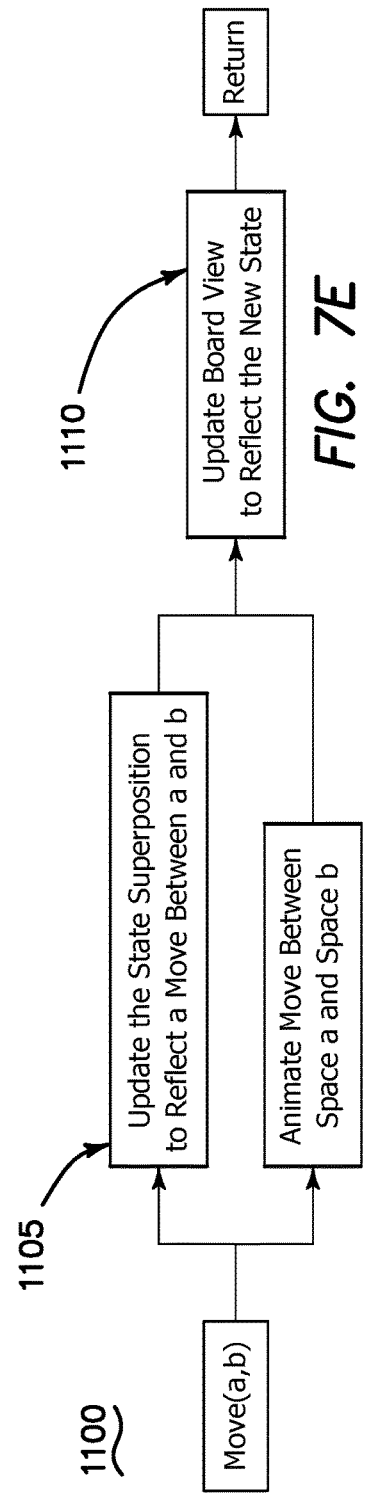

Flow chart 1100 of FIG. 7E details an attack action involving pieces potentially occupying spaces a and b. At 1105, the superposition state is updated so that opponent does not occupy space b and the attack action is visually animated. At 1110, the board view is updated.

Figure 8A:
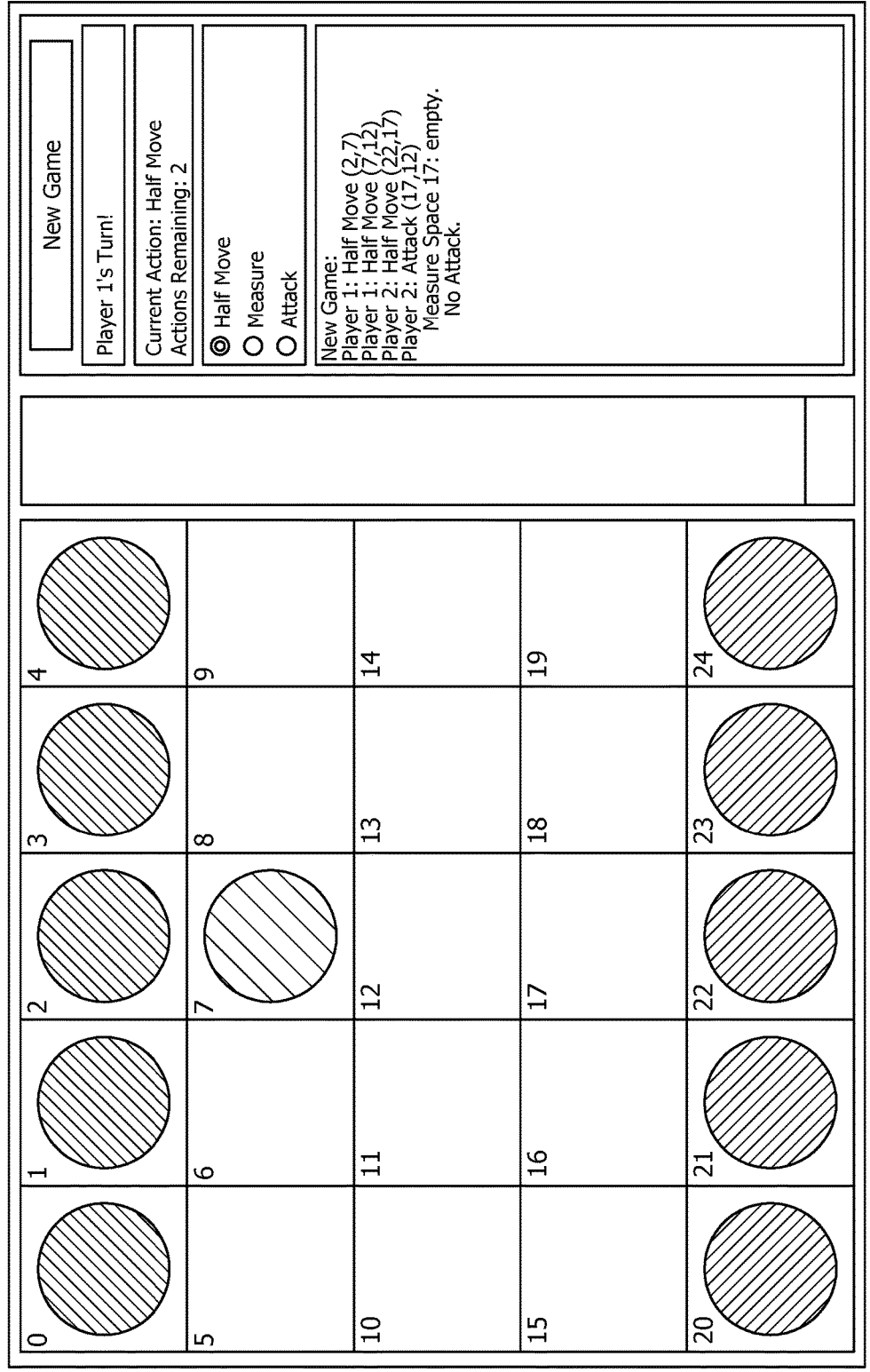

FIGS. 8A through 8C show screen shots depicting the possible outcomes of an attack. Screen shot 1201 of FIG. 8A is a failed attack based on a measurement that the attacking piece is not on the space from which it sought to attack. Screen shot 1202 of FIG. 8B is a failed attack based on a measurement that the attacked piece is not on the space on which it is being attacked. Screen shot 1203 of FIG. 8C is a successful attack based on a measurement that the attacking piece occupies the space from which it is attacking and the attacked piece occupies the space on which it is being attacked.

Although the invention has been described in detail with reference to several embodiments, additional variations and modifications exist within the scope and spirit of the invention as described and defined in the following claims.

I claim:

1. A computer-implemented chess game system incorporating quantum characteristics comprising:
   memory storing data for playing a chess game on a game display via a user interface and a processor configured to:
   responsive to a player inputting a desired move of a chess piece from a current space on a virtual chess board to a new space on said virtual chess board creating unique chess board states wherein said chess piece has a first probability of occupying said current space and a second probability of occupying said new space thus representing quantum superposition, said first probability and second probability as well as a representation of said chess piece being visually depicted on said game display relative to said current space and said new space;
   utilize a measurement function when two or more chess pieces have a non-zero probability of occupying a given space on said virtual game board to determine which game piece occupies said given space wherein said measurement function comprises selection of a random number and comparison of said random number to a probability of finding said game piece on said given space; and
   utilize an attack when a desired chess piece move raises the opportunity for two opposing chess pieces to occupy a same conflict space on said virtual chess board, said attack conducted as follows: (i) run a first measurement function to determine if an attacking chess piece occupies said conflict space; (ii) if said first measurement function results in a determination that said attacking chess piece occupies said conflict space, run a second measurement function to determine if a defending chess piece occupies said conflict space; and (iii) remove said defending chess piece if said first measurement function and said second measurement function determines that said attacking chess piece and said defending chess piece occupy said conflict space.

2. The computer-implemented game system of claim 1 wherein said processor is further configured to: receive quantum move inputs relative to certain chess pieces and cause said certain chess pieces to quantum move, said quantum move comprising two standard chess moves associated with said certain chess game piece.

3. The computer-implemented game system of claim 2 wherein said processor is further configured to: prevent a chess game piece from capturing another game chess piece based on a quantum move.

4. The computer-implemented game system of claim 2 wherein said certain game pieces comprise rooks, kings, queens, knights and bishops.

5. The computer-implemented game system of claim 1 wherein said processor is further configured to: display a chess game piece on two different spaces with a visual indication of the probability of said chess game piece being on each of said two spaces.

6. The computer-implemented game system of claim 1 wherein said processor is further configured to: display two chess game pieces on a single space indicative of said measurement function to determine which, if any, of said two chess game pieces occupy said space.

7. The computer-implemented game system of claim 1 wherein pursuant to said quantum superposition said chess piece has an equal probability of occupying said current space and said new space.

8. A non-transitory computer readable medium having stored thereon a computer program directed to conducting a chess game incorporating quantum characteristics, said computer-readable medium causing a computer to perform the steps of:
   responsive to a player inputting a desired move of a chess piece from a current space on a virtual chess board to a new space on said virtual chess board creating unique chess board states where said chess piece has a first probability of occupying said current space and a second probability of occupying said new space thus representing quantum superposition, said first probability and second probability as well as a representation of said chess piece being visually depicted on said game display relative to said current space and said new space;
   utilize a measurement function when two or more chess pieces have a non-zero probability of occupying a given space on said virtual game board to determine which game piece occupies said given space wherein said measurement function comprises selection of a random number and comparison of said random number to a probability of finding said game piece on said given space; and
   utilize an attack when a desired chess piece move raises the opportunity for two opposing chess pieces to occupy a same conflict space on said virtual chess board, said attack conducted as follows: (i) run a first measurement function to determine if an attacking chess piece occupies said conflict space; (ii) if said first measurement function results in a determination that said attacking chess piece occupies said conflict space, run a second measurement function to determine if a defending chess piece occupies said conflict space; and (iii) remove said defending chess piece if said first measurement function and said second measurement function determines that said attacking chess piece and said defending chess piece occupy said conflict space.

9. The non-transitory computer readable medium of claim 8 wherein said processor is further configured to: receive quantum move inputs relative to certain chess pieces and cause said certain chess pieces to quantum move, said quantum move comprising two standard chess moves associated with said certain chess game piece.

10. The non-transitory computer readable medium of claim 9 wherein said processor is further configured to: prevent a chess game piece from capturing another game chess piece based on a quantum move.

11. The non-transitory computer readable medium of claim 9 wherein said certain game pieces comprise rooks, kings, queens, knights and bishops.

12. The non-transitory computer readable medium of claim 8 wherein said processor is further configured to: display a chess game piece on two different spaces with a visual indication of the probability of said chess game piece being on each of said two spaces.

13. The non-transitory computer readable medium of claim 8 wherein said processor is further configured to: display two chess game pieces on a single space indicative of said measurement function to determine which, if any, of said two chess game pieces occupy said space.

14. The non-transitory computer readable medium of claim 8 wherein pursuant to said quantum superposition said chess piece has an equal probability of occupying said current space and said new space.

15. A method of operating a computerized chess tool incorporating quantum characteristics comprising:
configuring a processor to:
display a virtual chess board and chess game pieces;
accept player inputs to move a first group of chess game pieces in a standard manner on said virtual chess board;
accept player inputs to move a second group of chess game pieces in a quantum process, said quantum process comprising displaying a select chess game piece on a first space from which said select chess game piece is moved and a second space onto which the select game piece is moved where said select chess piece has a first probability of occupying said current space and a second probability of occupying said second space thus representing quantum superposition, said first probability and second probability as well as a representation of said chess piece being visually depicted on said game display relative to said current space and said new space;

utilize a measurement function when two or more chess pieces have a non-zero probability of occupying a given space on said virtual game board to determine which game piece occupies said given space wherein said measurement function comprises selection of a random number and comparison of said random number to a probability of finding said game piece on said given space; and utilize an attack when a desired chess piece move raises the opportunity for two opposing chess pieces to occupy a same conflict space on said virtual chess board, said attack conducted as follows: (i) run a first measurement function to determine if an attacking chess piece occupies said conflict space; (ii) if said first measurement function results in a determination that said attacking chess piece occupies said conflict space, run a second measurement function to determine if a defending chess piece occupies said conflict space; and (iii) remove said defending chess piece if said first measurement function and said second measurement function determines that said attacking chess piece and said defending chess piece occupy said conflict space.

16. The method of claim 15 wherein said quantum process further comprises two standard chess moves associated with said chess game piece.

17. The method of claim 16 further comprising configuring said processor to: prevent a chess game piece from capturing another game chess piece based on a quantum move.

18. The method of claim 15 wherein said second group of chess game pieces comprises rooks, kings, queens, knights and bishops.

19. The method of claim 15 further comprising configuring said processor to: display a chess game piece on two different spaces with a visual indication of the probability of said chess game piece being on each of said two spaces.

20. The method of claim 15 further comprising configuring said processor to: display two chess game pieces on a single space indicative of said measurement function to determine which, if any, of said two chess game pieces occupy said space.

21. The method of claim 15 wherein pursuant to said quantum superposition said chess piece has an equal probability of occupying said current space and said new space.

* * * * *